US010969886B2

(12) United States Patent
Wen et al.

(10) Patent No.: US 10,969,886 B2
(45) Date of Patent: Apr. 6, 2021

(54) CAPACITIVE SENSING SYSTEM AND MOBILE DEVICE

(71) Applicant: SHENZHEN GOODIX TECHNOLOGY CO., LTD., Guangdong (CN)

(72) Inventors: Ya-Nan Wen, Guangdong (CN); Hong Jiang, Guangdong (CN); Yingsi Liang, Guangdong (CN)

(73) Assignee: SHENZHEN GOODIX TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 16/207,827

(22) Filed: Dec. 3, 2018

(65) Prior Publication Data

US 2019/0163305 A1    May 30, 2019

Related U.S. Application Data

(63) Continuation of application No. PCT/CN2017/112867, filed on Nov. 24, 2017.

(51) Int. Cl.
*G06F 3/045* (2006.01)
*G06F 3/041* (2006.01)
(Continued)

(52) U.S. Cl.
CPC .......... *G06F 3/0412* (2013.01); *G06F 1/1643* (2013.01); *G06F 1/3296* (2013.01);
(Continued)

(58) Field of Classification Search
CPC combination set(s) only.
See application file for complete search history.

(56) References Cited

U.S. PATENT DOCUMENTS

| 5,754,413 A | 5/1998 | Fraidlin et al. |
| 6,021,499 A | 2/2000 | Aleshi |

(Continued)

FOREIGN PATENT DOCUMENTS

| CN | 101000413 A | 7/2007 |
| CN | 103513813 A | 1/2014 |

(Continued)

OTHER PUBLICATIONS

English Abstract Translation of CN103513814A.
(Continued)

*Primary Examiner* — Nan-Ying Yang
(74) *Attorney, Agent, or Firm* — WPAT, P.C., Intellectual Property Attorneys; Anthony King (57) ABSTRACT

The present disclosure provides a mobile device. The mobile device includes a casing, configured to accommodate or support the mobile device; a thin touchscreen, including at least one driving electrode and at least one receiving electrode, wherein the driving electrode is configured to receive a driving signal, and the receiving electrode is configured to generate a sensing signal to sense a touch operation; a capacitive sensing system, including a sense circuit, coupled to the at least one receiving electrode and configured to generate the driving signal and receive the sensing signal to determine the touch operation; and a power supply unit, configured to output a supply voltage and a ground voltage; and an isolation module, configured to isolate the supply voltage from the ground voltage.

20 Claims, 4 Drawing Sheets

(51) Int. Cl.
*G06F 3/044* (2006.01)
*G06F 1/16* (2006.01)
*G06F 1/3296* (2019.01)

(52) U.S. Cl.
CPC ............ *G06F 3/044* (2013.01); *G06F 3/0416* (2013.01); *G06F 3/0446* (2019.05); *G06F 2203/04107* (2013.01)

(56) References Cited

U.S. PATENT DOCUMENTS

| | | | |
|---|---|---|---|
| 9,151,791 B2 | 10/2015 | Roziere | |
| 2004/0022075 A1 | 2/2004 | Perry | |
| 2010/0013788 A1 | 1/2010 | Park et al. | |
| 2010/0220071 A1 | 9/2010 | Nishihara et al. | |
| 2010/0220074 A1* | 9/2010 | Irvin, Jr. | G06F 3/045 345/174 |
| 2011/0090175 A1* | 4/2011 | Mamba | G06F 3/0412 345/174 |
| 2012/0306777 A1* | 12/2012 | Kang | G06F 3/044 345/173 |
| 2016/0041651 A1* | 2/2016 | Nakamura | G06F 3/044 345/174 |
| 2016/0335467 A1 | 11/2016 | Su et al. | |
| 2017/0003779 A1 | 1/2017 | Reynolds et al. | |
| 2017/0316245 A1* | 11/2017 | Li | C09J 9/02 |
| 2018/0166507 A1* | 6/2018 | Hwang | H01L 27/323 |
| 2018/0314358 A1* | 11/2018 | Roberts | G06F 3/0416 |

FOREIGN PATENT DOCUMENTS

| | | |
|---|---|---|
| CN | 103513814 A | 1/2014 |
| CN | 107223230 A | 9/2017 |

OTHER PUBLICATIONS

English Abstract Translation of CN101000413A.
English Abstract Translation of CN103513813A.
English Abstract of CN107223230A.

* cited by examiner

CAPACITIVE SENSING SYSTEM AND MOBILE DEVICE

CROSS-REFERENCE TO RELATED APPLICATIONS

The present disclosure is a continuation of International Application No. PCT/CN2017/112867, filed on Nov. 24, 2017, which is hereby incorporated by reference in its entirety.

BACKGROUND

The present disclosure relates to a capacitive sensing system and a mobile device, and in particular, to a capacitive sensing system applicable in a thin touchscreen and a mobile device having the thin touchscreen.

With the advancement of technology, touch-based mobile devices have become indispensable to our daily lives. Through the touchscreen, one may use his/her finger or a stylus to operate the mobile device conveniently. To reduce the occurrence of misjudgment when the user performs multi-finger touch, most capacitive touch technologies adopt the mutual-capacitance sensing principle. Specifically, mutual-capacitance touch sensing uses a sensing panel disposed at a backside of a touchscreen panel for touch sensing. A distribution of an electromagnetic field of the touchscreen varies according to a position at which a user touches, thus causing a change in the mutual-capacitance between electrodes of the sensing panel. As a result, the sensing panel may determine the user's touch operation by detecting a variation of a current flowing through the electrodes.

However, it should be noted that many mobile devices adopt a thinner touchscreen, such as a touch panel having a thinner cover layer (i.e., a thin cover). When the user performs a touch operation, such thinner touchscreen may have a greater induced capacitance between the electrode of the sensing panel and the human body. In these cases, when the mobile device is in a non-floating state (i.e., a grounding state), a larger portion of an induced current generated between the user and the detection electrode will be directed to the ground via the human body, instead of flowing to the detection electrode, because the mobile device is in the non-floating state. Therefore, when the detection electrode receives the current in the non-floating state, the amount of induced current received by the detection electrode is less than that received by the detection electrode in the floating state, resulting in an increase in the proportion of the noise voltage in the induced current. Briefly, the amount of induced current of the mobile device having a thin touchscreen is different from that of the mobile device in the non-floating state. However, the host or the system determines whether a touch has taken place in accordance with the sensed amount of induced current and a pre-stored reference amount, wherein the reference amount is relatively constant and will not change in response to whether the mobile device is in the floating or non-floating states. Thus, the determination of the touch operation in one of the floating state or the non-floating state will be inaccurate, resulting in misjudgment of the touch operation.

In view of the foregoing, there is a need for improvement in the related art.

SUMMARY

Therefore, a main object of some embodiments of the present disclosure is to provide a capacitive sensing system applicable in a mobile device, which is used for resolving the issue of different amounts of induced current of the mobile device in the floating state and non-floating state, so as to overcome the drawbacks of the prior art.

In order to resolve the above issues, the present disclosure provides a mobile device. The mobile device comprises a casing, configured to accommodate or support the mobile device; a thin touchscreen, comprising at least one driving electrode and at least one receiving electrode, wherein the driving electrode is configured to receive a driving signal, and the receiving electrode is configured to generate a sensing signal to sense a touch operation; a capacitive sensing system, comprising a sense circuit, coupled to the at least one receiving electrode and configured to generate the driving signal and receive the sensing signal to determine the touch operation, and a power supply unit, configured to output a supply voltage and a ground voltage; and an isolation module, configured to isolate the supply voltage and the ground voltage.

For instance, the casing receives the ground voltage.

For instance, the thin touchscreen has a thickness less than 400 micrometers.

For instance, the thin touchscreen is further configured to perform full-screen fingerprint recognition.

For instance, the thin touchscreen is a flexible screen.

For instance, the isolation module comprises an isolation circuit, coupled to the power supply unit and configured to generate a floating supply voltage and a floating ground voltage according to the supply voltage and the ground voltage. The floating supply voltage and the floating ground voltage are isolated from the supply voltage and the ground voltage, wherein the sense circuit receives the floating supply voltage and the floating ground voltage to stay in a floating state to float with respect to the ground voltage.

For instance, the thin touchscreen receives the floating supply voltage and the floating ground voltage to stay in the floating state to float with respect to the ground voltage.

For instance, a voltage difference between the floating supply voltage and the floating ground voltage is a fixed value.

For instance, the isolation circuit is a direct current to direct current (DC/DC) converter, configured to receive the supply voltage and the ground voltage to generate the floating supply voltage and the floating ground voltage. The DC/DC converter comprises: an input capacitor, coupled between the supply voltage and the ground voltage; an output capacitor, coupled between the floating supply voltage and the floating ground voltage; a control unit, coupled to the input capacitor; an inductor, coupled between the control unit and the output capacitor, and configured to perform a voltage conversion operation; and a rectifier assembly, coupled between the inductor and the output capacitor.

For instance, the thin touchscreen further comprises a transparent substrate, wherein the driving electrode and the receiving electrode are disposed on the transparent substrate; and a guard ring, disposed adjacent to the transparent substrate and connected to the floating ground voltage.

For instance, the mobile device further comprises an isolating material, wherein the casing is configured to accommodate the thin touchscreen and is connected to the ground voltage, and the isolating material is disposed between the guard ring and the casing to isolate the guard ring from the casing.

For instance, the isolating material has a relative permittivity ranging from 1 to 3, 1 to 2, 2 to 3, or 1 to 2.8.

The present disclosure further provides a capacitive sensing system. The capacitive sensing system comprises a sense circuit, coupled to a capacitor array, and configured to generate a driving signal to the capacitor array, and receive a sensing signal from the capacitor array to determine a touch operation; a power supply unit, configured to output a supply voltage and a ground voltage; and an isolation module, configured to isolate the supply voltage and the ground voltage from the sense circuit.

For instance, the isolation module generates a floating supply voltage and a floating ground voltage according to the supply voltage and the ground voltage, and provides the floating supply voltage and floating ground voltage to the sense circuit to isolate the supply voltage and the ground voltage.

For instance, a voltage difference between the floating supply voltage and the floating ground voltage is a fixed value.

For instance, the isolation module comprises a DC/DC converter, configured to receive the supply voltage and the ground voltage to generate the floating supply voltage and the floating ground voltage. The DC/DC converter comprises an input capacitor, coupled between the supply voltage and the ground voltage; an output capacitor, coupled between the floating supply voltage and the floating ground voltage; a control unit, coupled to the input capacitor; an inductor, coupled between the control unit and the output capacitor, and configured to perform a voltage conversion operation; and a rectifier assembly, coupled between the inductor and the output capacitor.

For instance, the capacitor array is disposed on a thin touchscreen, and the isolation module further provides the floating supply voltage and floating ground voltage to the thin touchscreen.

For instance, the capacitor array is disposed on a whole screen of a thin touchscreen and configured to perform fingerprint recognition.

DETAILED DESCRIPTION

The detailed description provided below in connection with the appended drawings is intended as a description of the present examples so that so that those skilled in the art may better understand the purposes, technical solutions, and advantages of the present application. It should be noted that the embodiments of the present application are provided for illustrative purposes, and are not limiting.

Figure 1:
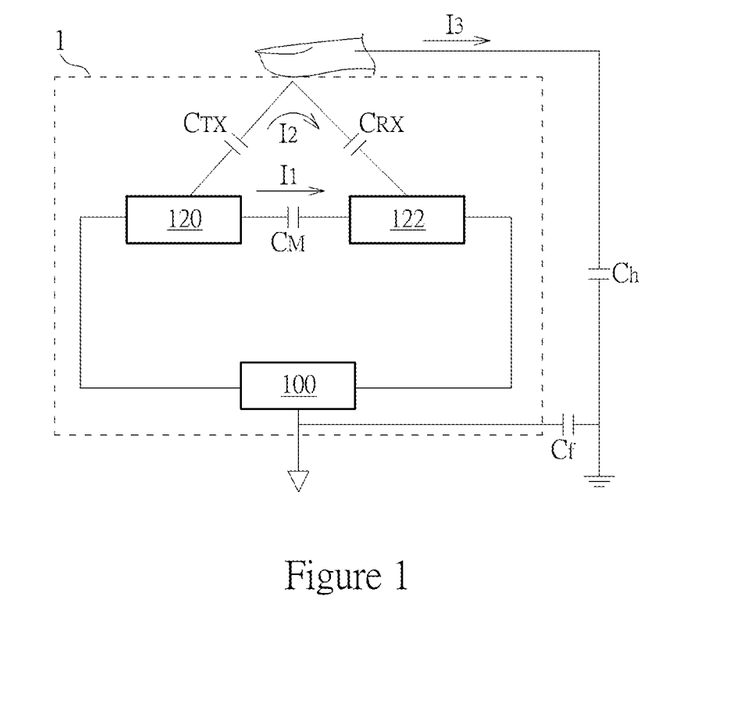
FIG. 1 is a schematic diagram illustrating the touch operation of a thin touchscreen-based mobile device.

Reference is made to FIG. 1, which is a schematic diagram illustrating the touch operation of a mobile device 1 having a thin touchscreen. As shown in FIG. 1, the thin touchscreen-based mobile device 1 is a mobile device that operates in a non-floating state, wherein the thin touchscreen-based mobile device 1 is configured to generate a current path, which is coupled to ground potential through a coupling capacitor Cf. The thin touchscreen-based mobile device 1 comprises a driving electrode 120, a receiving electrode 122 (also referred to as a sense electrode) and a sense circuit 100. When the user performs a touch operation via the thin touchscreen-based mobile device 1, the thin touchscreen-based mobile device 1 may detect the touch operation by sensing a current, i.e., $I_1$, between the driving electrode and the receiving electrode. It should be noted that since the touchscreen of the thin touchscreen-based mobile device 1 is quite thin, the sensing result of the touch signal is very sensitive to the disturbance of the current. Specifically, when the mobile device 1 is in the non-floating state, that is, the thin touchscreen-based mobile device 1 is coupled to the ground potential, the coupling capacitor Cf between the receiving electrode of the thin touchscreen-based mobile device 1 and the ground potential has a larger capacitance. Since the coupling results in the capacitive coupling effect that generates an extra current path, when a finger touches the thin touchscreen, the finger coupled to the touchscreen generates an extra current path that allows an induced current to flow to the ground via the current path, i.e., $I_3$, of the human body.

In this way, as compared with the situation in which the mobile device 100 is in a floating state, the induced current flows through the current path, i.e., $I_2$, comprising the mutual capacitor $C_{TX}$ between the driving electrode 120 and the finger and the mutual capacitor $C_{RX}$ between the receiving electrode 122 and the finger, and returns to the sense circuit 100. The amount of current received by the sense circuit 100 increases relatively, whereas the amount of current received by the sense circuit 100 in the non-floating state reduces relatively because the thin touchscreen-based mobile device 1 is coupled to the ground. As a result, the variation of the amount of received current, generated by the sense circuit 100 due to the touch operation, may differ between the floating state and the non-floating state of the thin touchscreen-based mobile device 1, which in turn causes a reduction in the accuracy, stability and signal-to-noise ratio of the touch sensing. Briefly, the quality of the touch operation of the thin touchscreen-based mobile device 1 is affected by whether the thin touchscreen-based mobile device 1 is in the floating state, which may also affect the accuracy of the touch signal and degrade the user experience regarding the touch operation.

Therefore, the present disclosure provides a mobile device 2. Please refer to FIG. 2, which is a schematic diagram illustrating the mobile device 2 according to embodiments of the present disclosure. The mobile device 2 comprises a capacitive sensing system 20, a thin touchscreen 22, an isolation module 24, and a casing Fr. The present disclosure uses the isolation module 24 for isolating a ground voltage, so as to generate a floating ground voltage and a floating supply voltage. The thin touchscreen 22 is a touch panel having a thickness that is less than 400 micrometers, which is applicable in full-screen touch fingerprint recognition or a flexible screen of a mobile device. The thin touchscreen 22 is configured to output a mutual-capacitance sensing signal according to a touch operation of a user, and transmit the sensing signal to the capacitive sensing system 20 for recognizing the sensing signal, so as to make a judgment regarding the touch operation based on the recognition of the sensing signal. As used herein, the thickness of the thin touchscreen 22 may refer to a thickness of a cover of the thin touchscreen 22, or a thickness of a structure between the electrode of the touch panel and a surface contacted by the touch. The capacitive sensing system 20 comprises a sense circuit 200 and a power supply unit 202, wherein the sense circuit 200 is coupled to the thin touchscreen 22. The power supply unit 202 is configured to output a supply voltage Vdd and a ground voltage Gnd, whereas the casing Fr receives the ground voltage Gnd. In this case, the supply voltage Vdd and the ground voltage Gnd may be referred to as a system supply voltage and a system ground voltage, respectively. In order to address the issue where a misjudgment of the touch operation may arise because the mobile device 2 may be in a floating or non-floating state, the present invention provides an isolation module 24, which comprises an isolation circuit 240. By using the isolation circuit 240 coupled to the power supply unit 202, the mobile device 2 can generate a floating supply voltage Vdd_f and a floating ground voltage Gnd_f are generated according to the supply voltage Vdd and the ground voltage Gnd, so as to solve the issue of the misjudgment of the touch operation. In this way, no matter whether the mobile device 2 is in the floating state or non-floating state, the voltage differences between the floating supply voltage Vdd_f and the floating ground voltage Gnd_f in the two different states are kept constant and isolated from the supply voltage Vdd and the ground voltage Gnd with the use of the voltage isolation provided by the isolation circuit 240. Consequently, the sense circuit 200 may operate stably, thereby increasing the quality of the signal detection of the touch operation of the capacitive sensing system 20.

Figure 2:
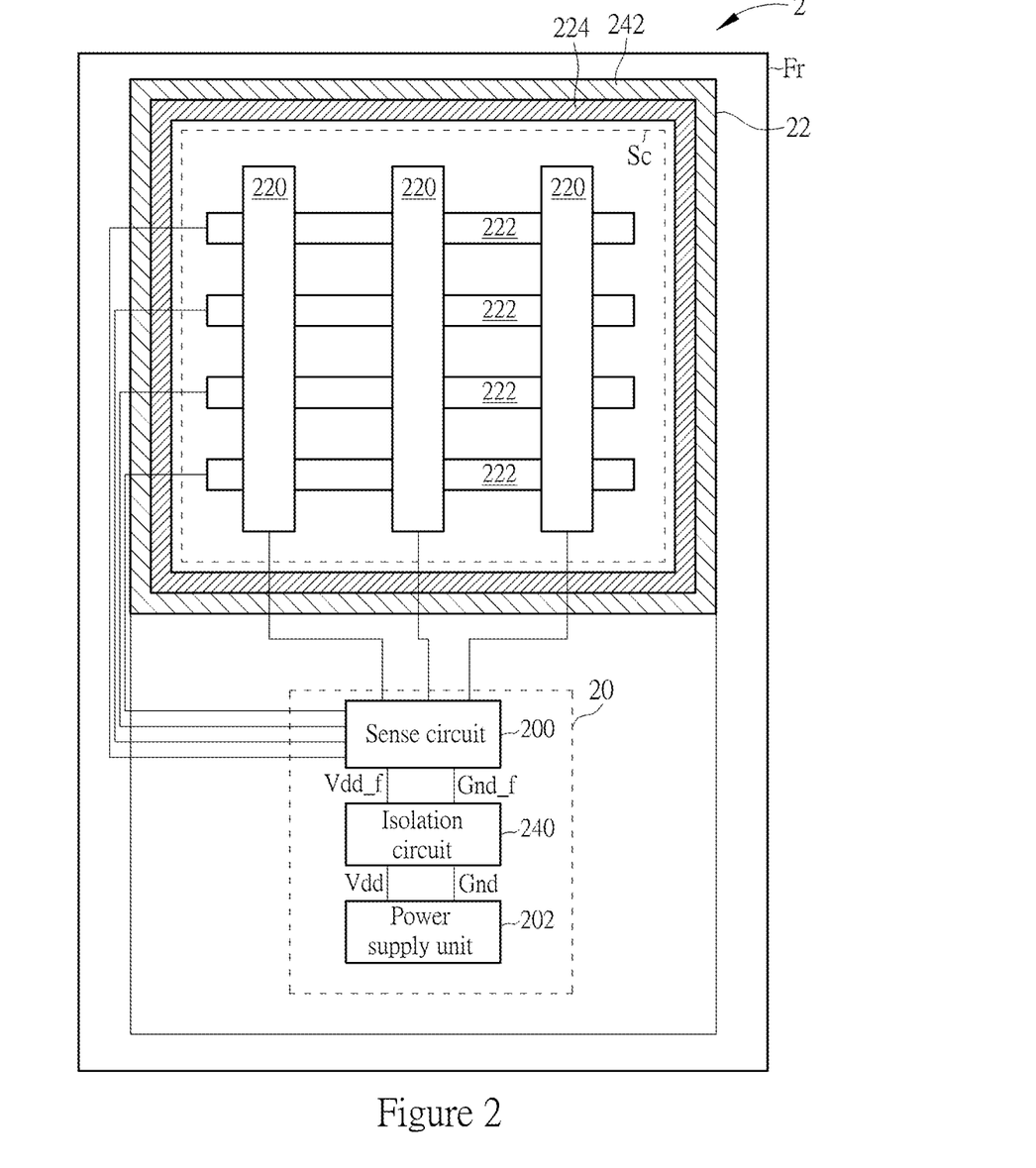
FIG. 2 is a schematic diagram illustrating a mobile device according to embodiments of the present disclosure.

In one embodiment, the thin touchscreen 22 comprises a transparent substrate Sc, at least one driving electrode 220 and at least one receiving electrode 222. The at least one driving electrode 220 and the at least one receiving electrode 222 are disposed on the transparent substrate Sc, and are configured to sense a touch operation performed on the thin touchscreen 22 by the user and to generate a sensing signal to be delivered to the capacitive sensing system 20. In this case, the driving electrode 220 and the receiving electrode 222 form a mutual-capacitance therebetween, and the value of this mutual-capacitance changes when the user touches or comes close to the thin touchscreen 22. In this case, the sense circuit 200 inputs a driving signal to the driving electrode 220, whereas the sensing signal received by the receiving electrode 222 is proportional to the value of the mutual-capacitance. Therefore, the value of the mutual-capacitance may be determined using the current of the sensing signal, thereby obtaining touch information. It should be noted that when a touch operation is performed and the mobile device 2 is in a non-floating state, a compensation current will be generated between the user and the driving electrode 220, wherein the compensation current will flow to the ground via the human body and then flow back to the mobile device 2 via the coupled ground. When a touch operation is performed and the mobile device 2 is in a floating state, the compensation current will not return to the mobile device 2 via the coupled ground, such that the compensation current is received by the receiving electrode 222. As a result, when the receiving electrode 222 receives a touch sensing signal in the floating state, the mobile device 2 cannot make adaptive adjustment in response to a change in the signal level of the touch signal, causing the misjudgment of the touch operation. Therefore, in this case, whether the mobile device 2 is in the floating state or the non-floating state would affect the receiving electrode 222 in sensing the touch signal, thereby causing the misjudgment of the touch operation.

Hence, the present disclosure provides the isolation circuit 240, which is coupled to the power supply unit 202 and configured to convert the supply voltage Vdd and the ground voltage Gnd, thereby providing the floating supply voltage Vdd_f and the floating ground voltage Gnd_f. It should be noted that the isolation circuit 240 may isolate the thin touchscreen 22 and the sense circuit 200 from the ground voltage Gnd, so that the thin touchscreen 22 and the sense circuit 200 are in a floating state to float with respect to the ground. Specifically, the isolation circuit 240 is coupled to the power supply unit 202. The isolation circuit 240 receives the supply voltage Vdd and the ground voltage Gnd, and converts the supply voltage Vdd and the ground voltage Gnd into the floating supply voltage Vdd_f and the floating ground voltage Gnd_f, respectively. Moreover, the isolation circuit 240 further transmits the floating supply voltage Vdd_f and the floating ground voltage Gnd_f to the thin touchscreen 22 and the sense circuit 200. As a result, the thin touchscreen 22 and the sense circuit 200 are not coupled to the ground directly, but isolated from the supply voltage Vdd and ground voltage Gnd through the isolation circuit 240. The thin touchscreen 22 and the sense circuit 200 are in the floating state, i.e. floating with respect to the ground. By maintaining the thin touchscreen 22 and the sense circuit 200 in the floating state, the quality of the signal sensing of the touch operation of the capacitive sensing system 20 is improved.

In other words, during the touch operation, the capacitive sensing system 20 is configured to provide the mobile device 2 a stable and isolated (with respect to the ground) floating supply voltage and floating ground voltage, so as to isolate the power supply and the ground voltage. This can ameliorate the inconsistency in the sensing current of the mobile device 2 between the floating state and the non-floating state, thereby improving the signal-to-noise ratio (SNR) of the touch sensing.

Figure 3:
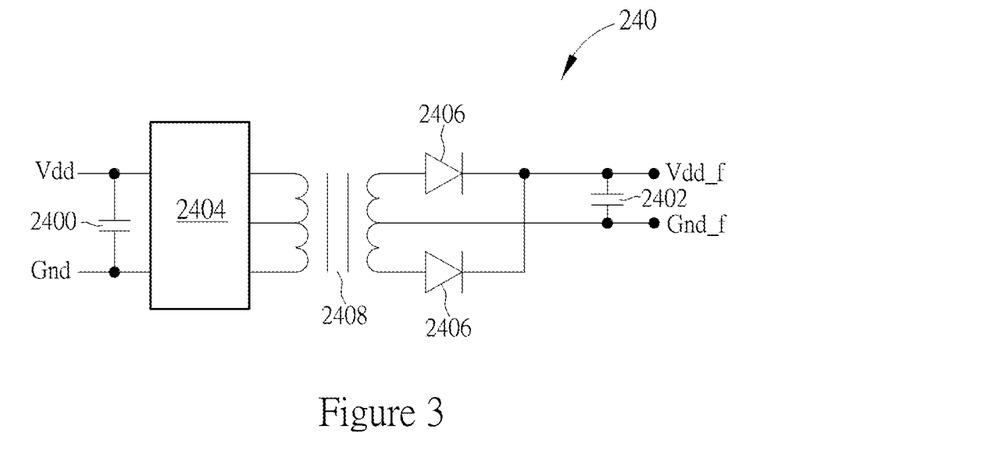
FIG. 3 is a schematic diagram illustrating an isolation circuit according to embodiments of the present disclosure.

Specifically, please refer to FIG. 3, which is a schematic diagram illustrating an isolation circuit 240 according to embodiments of the present disclosure. In this example, the isolation circuit 240 is a direct current-to-direct current converter (DC/DC converter), which is configured to convert the voltage value of a set of DC voltages to output another set of independent voltages, and isolate the input voltage from the output voltage. In one embodiment, the isolation circuit 240 comprises an input capacitor 2400, an output capacitor 2402, a control unit 2404, and diodes 2406. The input capacitor 2400 is coupled between the supply voltage Vdd and the ground voltage Gnd. The output capacitor 2402 is coupled to the floating supply voltage Vdd_f and the floating ground voltage Gnd_f; that is, the two terminals of the output capacitor 2402 serve as output terminals of the floating supply voltage and the floating ground voltage, respectively. The control unit 2404 is coupled to two terminals of the input capacitor 2400. The diode 2406 is coupled to the floating supply voltage Vdd_f. The inductor 2408 is coupled between the control unit 2404 and the two diodes 2406, and is configured to perform voltage conversion. In this case, both cathodes of the two diodes 2406 are connected to one terminal of the output capacitor 2402, and are coupled to the floating supply voltage Vdd_f. Both the anodes of the two diodes 2406 are connected to the inductor 2408. Hence, the isolation circuit 240 regulates a voltage of an input signal via the input capacitor 2400 coupled to the supply voltage Vdd and the ground voltage Gnd, and obtains DC voltage values of the supply voltage Vdd and the ground voltage Gnd for voltage conversion. The control unit 2404, coupled to the input capacitor 2400, is configured to transmit a corresponding current or voltage to the inductor 2408 according to the user requirements, thereby maintaining the efficiency and voltage regulation of the system, and keeping the power of the isolation circuit within a safe range. The inductor 2408, coupled to control unit 2404, is configured to convert the DC voltage value and transmit the converted signal to the diode 2406 for rectification. The output capacitor 2402 is coupled to the diode 2406, and configured to regulate the rectified voltage, thereby generating a stable floating supply voltage Vdd_f and floating ground voltage Gnd_f.

Hence, capacitive sensing system 20 may generate the floating supply voltage Vdd_f and the floating ground voltage Gnd_f according to the supply voltage Vdd and the ground voltage Gnd with the use of the isolation circuit 240. It should be noted that the sense circuit 200, coupled to the floating supply voltage Vdd_f and the floating ground voltage Gnd_f, may keep the thin touchscreen 22 and the sense circuit 200 in the floating state; that is, the sense circuit 200 is floating with respect to the ground. In this case, a misjudgment of the tough operation, resulting from uncoupling between the casing Fr of the mobile device 2 and the ground, will not take place, improving the quality of the sensing and user experience.

Figure 4:
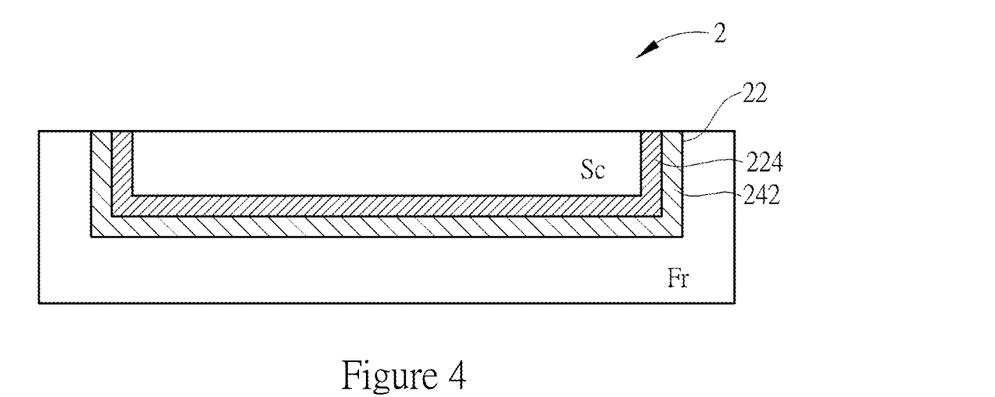
FIG. 4 is a cross-sectional view illustrating a mobile device according to embodiments of the present disclosure.

Additionally, please refer to FIG. 4, which is a cross-sectional view illustrating the mobile device 2 according to embodiments of the present disclosure. As shown in FIG. 4, the mobile device 2 comprises the casing Fr and receives the ground voltage Gnd. The thin touchscreen 22, on the other hand, comprises a guard ring 224 and receives the floating ground voltage Gnd_f. It should be noted that the guard ring 224 is disposed outside of and below the thin touchscreen 22. Specifically, the guard ring 224 is disposed outside of and below the transparent substrate Sc, and is configured to improve the stability of the potential of the transparent substrate Sc, the driving electrode 220, and the receiving electrode 222 in the thin touchscreen 22, and reduce the interference and noises received by the electrode. Hence, in general, the guard ring 224 is disposed in adjacent to and in contact with the casing Fr. However, in the present disclosure, the isolation circuit 240 is used to generate the floating supply voltage Vdd_f and the floating ground voltage Gnd_f, so as to keep the thin touchscreen 22 and the sense circuit 200 in the floating state. To further keep the thin touchscreen 22 in the floating state such that a situation where the thin touchscreen 22 receives the ground voltage Gnd because of the contact between the guard ring 224 and the casing Fr will not occur, the isolation module 24 further comprises an isolating material 242, which is disposed at a side surface of and below the guard ring 224. The isolating material 242 is disposed between the casing Fr and the guard ring 224, and is configured to isolate the ground voltage Gnd from the floating ground voltage Gnd_f. Maintaining the floating state of the floating ground voltage Gnd_f can prevent the casing Fr and the guard ring 224 from being in contact with each other, wherein the contact between the casing Fr and the guard ring 224 causes the coupling between the ground voltage Gnd and the floating ground voltage Gnd_f, thereby degrading the current-based touch sensing function of the capacitive sensing system 20.

Specifically, to prevent the isolating material 242 from transmitting the voltage, the suitable isolating material 242 may be chosen depending on the permittivity of the material, so that the isolating material 242 can have a lower permittivity. For example, the relative permittivity of the isolating material 242, i.e., a ratio of the permittivity of the material to the vacuum permittivity, can range from 1 to 4. Preferably, the relative permittivity of the isolating material 242 can be in the range of 1 to 3, or 1 to 2.8, or 1 to 2, or 2 to 2.5, etc. In other words, when an external electric field is applied to the isolating material 242, it is more difficult to polarize the isolating material 242. As a result, it is difficult for the external electric field to transmit an electric field via the isolating material 242, thus effectively isolating the ground voltage Gnd coupled to the casing Fr from the floating ground voltage Gnd_f coupled to the guard ring 224.

Therefore, by disposing the isolating material 242 at the lateral side of and below the capacitive sensing system 20, and between the casing Fr and the guard ring 224, the isolating material 242 can be used to isolate the ground voltage Gnd from the floating ground voltage Gnd_f. This prevents a direction connection between the ground voltage Gnd and the floating ground voltage Gnd_f, which results from the contact between the casing Fr and the guard ring 224. In this way, the capacitive sensing system 20 can stay in the floating state when performing the touch sensing operation, maintaining the stability of the touch operation further.

Figure 5:
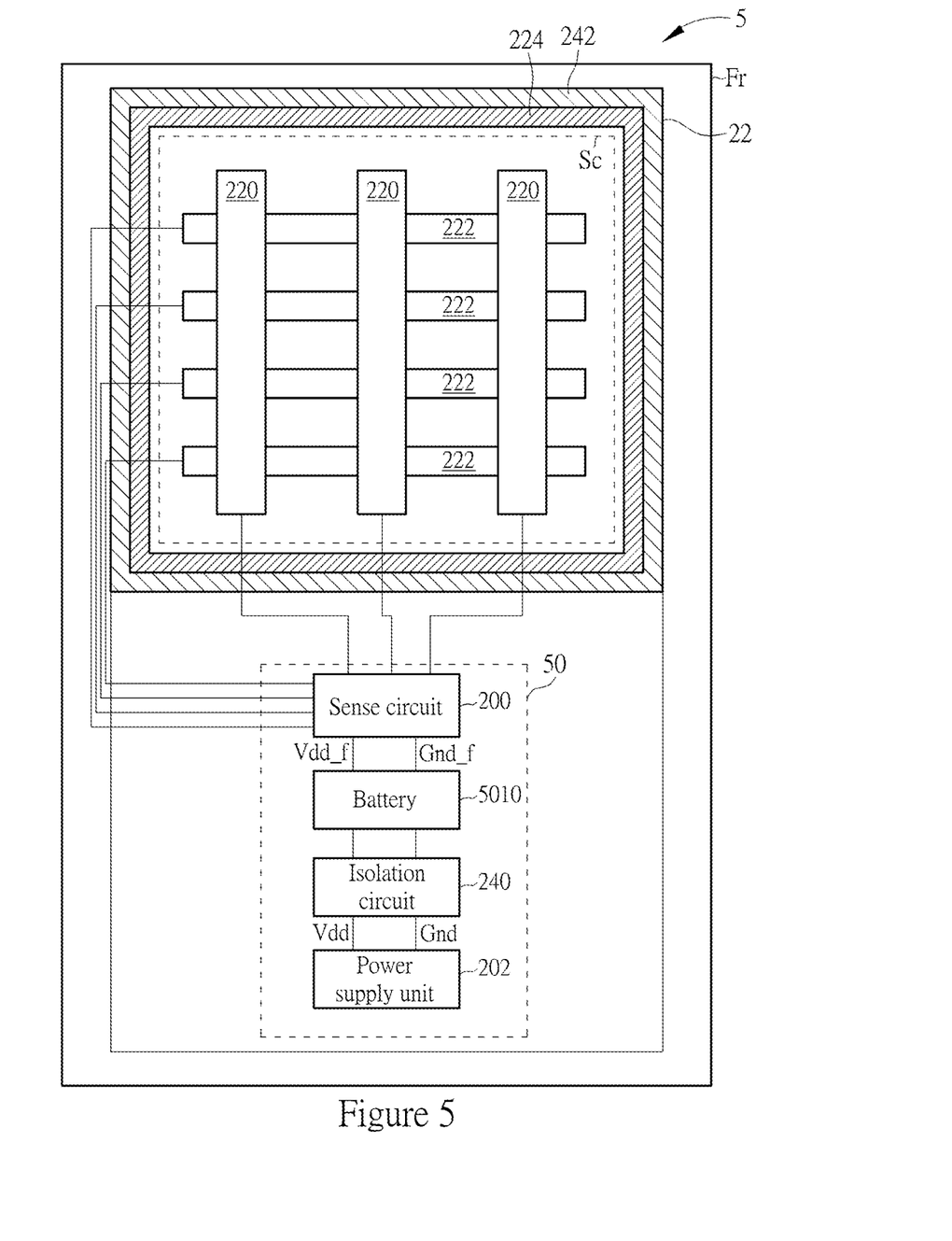
FIG. 5 is a schematic diagram illustrating a mobile device according to embodiments of the present disclosure.

It should be noted that the foregoing embodiments are provided for the purpose of explaining the ideas and principles of the present disclosure, and persons having ordinary skill in the art may make various modifications thereto. For example, the present disclosure is not limited to using a DC/DC converter to implement the isolation circuit 240. It is also feasible to use a voltage follower to implement the isolation circuit 240, as long as the voltage follower is capable of isolating the ground voltage Gnd from the floating ground voltage Gnd_f and generating the floating supply voltage Vdd_f according to the supply voltage Vdd. Additionally, please refer to FIG. 5, which is a schematic diagram illustrating a mobile device 5 according to another embodiment of the present disclosure. The mobile device 5 is similar to the mobile device 2, and hence, the same reference numerals are used to indicate the same components. As shown in the FIG. 5, the capacitive sensing system 50 of the mobile device 5 further comprises a battery 5010, which is coupled between the isolation circuit 240 and the sense circuit 200. The battery 5010 is a backup battery for the mobile device 5 and is configured to provide backup power to the capacitive sensing system 50. The battery 5010 can be arranged in various manners. For example, the battery 5010 may be, but is not limited to, disposed outside of the capacitive sensing system 50 or integrated into the capacitive sensing system 50. Therefore, when the power supply unit 202 fails to provide an electrical output because of insufficient power, the mobile device 5 may continue operating with the use of the battery 5010. It should be noted that when the battery power of the battery 5010 decreases and the battery power of the power supply unit 202 is sufficient, the power supply unit 202 may charge the battery 5010 via the isolation circuit 240.

In view of the foregoing, the present disclosure uses the isolation circuit and the isolating material of the isolation module to isolate the supply voltage from the ground voltage, so as to generate the floating supply voltage and the floating ground voltage. In this way, when the user performs a touch operation on the thin touchscreen, the reduction of the signal quality of the touch operation, resulting from a difference between respective induced currents of the device in the floating state and the non-floating state, will not occur. The floating ground voltage can keep the ground voltage in an isolated state, so that the user may use the mobile device to perform the touch operation steadily.

As used herein, the phrase "non-floating state" comprises, but is not limited to, the conditions where the device is being charged or held by the hand of the user whose body has a good ground connection.

In view of the foregoing, as compared to the conventional art, embodiments of the present disclosure can keep the capacitive sensing system and the thin touchscreen in the floating state, so that the capacitive sensing system will not make misjudgment about the touch operation to thereby overcome the drawbacks of the prior art, wherein the misjudgment results from a difference between the induced currents of the mobile device in a floating and non-floating state.

What is claimed is:

1. A mobile device, comprising:
   a casing, configured to accommodate or support the mobile device;
   a thin touchscreen, comprising at least one driving electrode and at least one receiving electrode, wherein the driving electrode is configured to receive a driving signal, and the receiving electrode is configured to generate a sensing signal to sense a touch operation;
   a capacitive sensing system, comprising:
      a sense circuit, electrically coupled to the at least one receiving electrode, and configured to generate the driving signal and receive the sensing signal to determine the touch operation; and
      a power supply unit, configured to output a supply voltage and a ground voltage; and
   an isolation circuit, configured to output a floating supply voltage and a floating ground voltage according to the supply voltage and the ground voltage, the floating supply voltage and the floating ground voltage being isolated from the supply voltage and the ground voltage;
   wherein the isolation circuit is a direct current to direct current (DC/DC) converter, configured to receive the supply voltage and the ground voltage to generate the floating supply voltage and the floating ground voltage; the DC/DC converter comprises:
      an input capacitor, coupled between the supply voltage and the ground voltage;
      an output capacitor, coupled between the floating supply voltage and the floating ground voltage;
      a control unit, coupled to the input capacitor;
      an inductor, coupled between the control unit and the output capacitor, and configured to perform a voltage conversion operation; and
      a rectifier assembly, coupled between the inductor and the output capacitor.

2. The mobile device of claim 1, wherein the casing receives the ground voltage.

3. The mobile device of claim 1, wherein the thin touchscreen has a thickness less than 400 micrometers.

4. The mobile device of claim 1, wherein the thin touchscreen is further configured to perform full-screen fingerprint recognition.

5. The mobile device of claim 1, wherein the thin touchscreen is a flexible screen.

6. The mobile device of claim 1, wherein the isolation circuit is coupled to the power supply unit, and the sense circuit receives the floating supply voltage and the floating ground voltage to stay in a floating state to float with respect to the ground voltage.

7. The mobile device of claim 6, wherein the thin touchscreen receives the floating supply voltage and the floating ground voltage to stay in the floating state to float with respect to the ground voltage.

8. The mobile device of claim 1, wherein when the casing is coupled to ground, the voltage difference between the floating supply voltage and the floating ground voltage has a first value; when the casing is uncoupled from the ground, the voltage difference between the floating supply voltage and the floating ground voltage has a second value equal to the first value.

9. The mobile device of claim 1, wherein a voltage difference between the floating supply voltage and the floating ground voltage is kept constant.

10. The mobile device of claim 6, wherein the thin touchscreen further comprises:
    a transparent substrate, wherein the driving electrode and the receiving electrode are disposed on the transparent substrate; and
    a guard ring, disposed adjacent to the transparent substrate and connected to the floating ground voltage.

11. The mobile device of claim 10, further comprising an isolating material, wherein the casing is configured to accommodate the thin touchscreen and is connected to the ground voltage, and the isolating material is disposed between the guard ring and the casing to isolate the guard ring from the casing.

12. The mobile device of claim 11, wherein the isolating material has a relative permittivity ranging from 1 to 3, 1 to 2, 2 to 3, or 1 to 2.8.

13. A capacitive sensing system, comprising:
    a sense circuit, coupled to a capacitor array, and configured to generate a driving signal to the capacitor array, and receive a sensing signal from the capacitor array to determine a touch operation;
    a power supply unit, configured to output a supply voltage and a ground voltage; and
    an isolation circuit, configured to generate a floating supply voltage and a floating ground voltage according to the supply voltage and the ground voltage, and provide the floating supply voltage and the floating ground voltage to the sense circuit to isolate the supply voltage and the ground voltage;
    wherein the isolation circuit comprises a DC/DC converter, configured to receive the supply voltage and the ground voltage to generate the floating supply voltage and the floating ground voltage; and the DC/DC converter comprises:
       an input capacitor, coupled between the supply voltage and the ground voltage;
       an output capacitor, coupled between the floating supply voltage and the floating ground voltage;
       a control unit, coupled to the input capacitor;
       an inductor, coupled between the control unit and the output capacitor, and configured to perform a voltage conversion operation; and
       a rectifier assembly, coupled between the inductor and the output capacitor.

14. The capacitive sensing system of claim 13, wherein the isolation circuit is configured to convert the supply voltage and the ground voltage to generate a set of voltages isolated from the supply voltage and the ground voltage; the capacitive sensing system further comprises:
    a battery, coupled between the isolation circuit and the sense circuit, the battery configured to output the floating supply voltage and the floating ground voltage to the sense circuit according to the set of voltages.

15. The capacitive sensing system of claim 14, wherein the power supply unit is configured to charge the battery via the isolation module.

16. The capacitive sensing system of claim 13, wherein a voltage difference between the floating supply voltage and the floating ground voltage is kept constant.

17. The capacitive sensing system of claim 13, wherein the capacitor array is disposed on a thin touchscreen, and the isolation circuit further provides the floating supply voltage and floating ground voltage to the thin touchscreen.

18. The capacitive sensing system of claim 13, wherein the capacitor array is disposed on a whole screen of a thin touchscreen and configured to perform fingerprint recognition.

19. The mobile device of claim 1, wherein the isolation circuit is configured to convert the supply voltage and the ground voltage to generate a set of voltages isolated from the supply voltage and the ground voltage; the mobile device further comprises:

a battery, coupled between the isolation circuit and the sense circuit, the battery configured to output the floating supply voltage and the floating ground voltage to the sense circuit according to the set of voltages.

20. A capacitive sensing system, comprising:

a sense circuit, coupled to a capacitor array, and configured to generate a driving signal to the capacitor array, and receive a sensing signal from the capacitor array to determine a touch operation;

a power supply unit, configured to output a supply voltage and a ground voltage; and     an isolation module, configured to provide a floating supply voltage and a floating ground voltage to the sense circuit according to the supply voltage and the ground voltage, and isolate the supply voltage and the ground voltage from the sense circuit according to the floating supply voltage and the floating ground voltage, wherein a voltage difference between the floating supply voltage and the floating ground voltage is a fixed value;

wherein the isolation module is configured to convert the supply voltage and the ground voltage to generate a set of voltages isolated from the supply voltage and the ground voltage; the capacitive sensing system further comprises:

a battery, coupled between the isolation module and the sense circuit, the battery configured to output the floating supply voltage and the floating ground voltage to the sense circuit according to the set of voltages.

* * * * *